June 14, 1949.
L. W. WIGHTMAN
2,473,267
BEARING MOUNTING
Filed Aug. 21, 1948
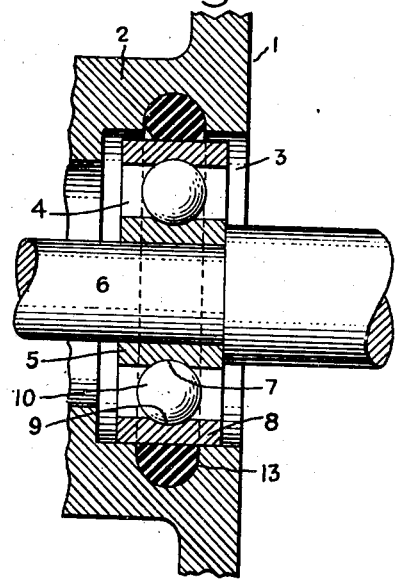
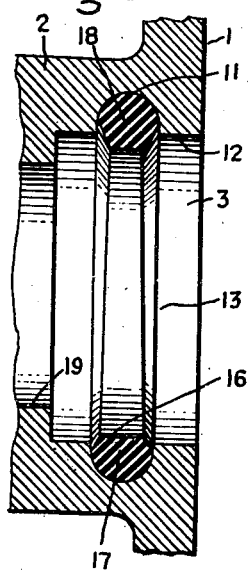
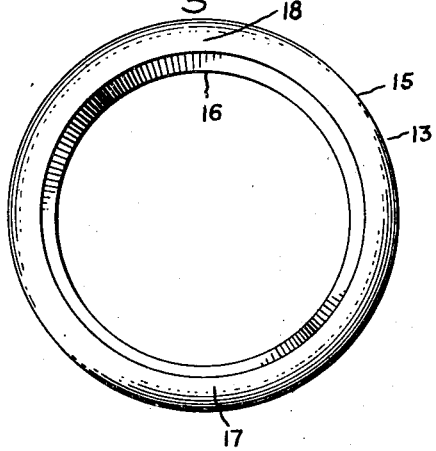
Inventor:
Lawrance W. Wightman,
by Prowell A. Mack
His Attorney.

Patented June 14, 1949

2,473,267

UNITED STATES PATENT OFFICE 2,473,267

BEARING MOUNTING

Lawrance W. Wightman, Fort Wayne, Ind., assignor to General Electric Company, a corporation of New York Application August 21, 1948, Serial No. 45,453

5 Claims. (Cl. 308—236)

This invention relates to bearing mountings and more particularly to mountings for bearings of the anti-friction type.

Anti-friction bearings comprise inner and outer bearing races with anti-friction elements, such as balls or rollers, interposed between the races. The inner bearing race is usually secured to and rotates with the shaft while the outer bearing race is mounted against rotation in a stationary bearing housing member. In the design of anti-friction bearing mountings, it is desirable to have the outer bearing race fixed with respect to the bearing housing so that play between the outer bearing race and the inner wall of the bearing housing is eliminated. It is also necessary that the bearing be capable of proper alignment with the other bearings on the same shaft so that the parallel relationship of the inner and outer bearing races is not destroyed. If, however, the outer bearing race is loose with respect to the bearing housing, the outer race will, by pounding under eccentric loading conditions, increase the size of the bearing housing opening producing undesirable noise. Various methods have been used to fix the outer bearing race in the bearing housing such as actually bolting or locking the outer bearing race to the bearing housing, or providing a machined slipfit for the outer bearing race. Both of these methods are expensive and furthermore, do not allow for realignment of the bearing due to shaft eccentricity. Numerous cushioning arrangements have been utilized to provide for self-alignment of the bearing including resilient rings interposed between the outer bearing race and the inner surface of the bearing. These arrangements, however, while cushioning the bearing, do not correct for the pounding action of the bearing, which is not fixed with respect to the bearing housing, which produces an accompanying increase in wear and noise.

An object of this invention is to provide an improved bearing mounting.

Another object of this invention is to provide an improved mounting for anti-friction bearings.

A further object of this invention is to provide an improved ball bearing mounting wherein the bearing is fixed with respect to the housing to eliminate noise and wear and the bearing is properly cushioned to permit self-alignment.

Further objects and advantages of this invention will be better understood from the following description referring to the accompanying drawing. The features of novelty which characterize this invention will be pointed out with particularity in the claims annexed to and forming a part of this specification.

In accordance with this invention, there is provided an annular ring of resilient material seated in an annular groove in the bearing housing and engaging the outer bearing race. This ring has its inner surface eccentric with respect to its outer surface providing cross-sections of maximum and minimum thickness. When mounted in the bearing housing, the section of the ring of maximum thickness forces the bearing against the diametrically opposite wall of the bearing housing holding the bearing firmly in place. The resiliency of the ring takes up any play between the outer bearing race and the housing thus eliminating excessive wear and noise and permitting realignment of the bearing.

In the drawing, Fig. 1 is a side elevational view, partly in section, illustrating the improved ball bearing mounting of this invention with the eccentric ring and bearing in place in the bearing housing; Fig. 2 illustrates the eccentric ring positioned in the annular groove in the bearing housing prior to insertion of the bearing; and Fig. 3 illustrates the eccentric annular ring of Figs. 1 and 2.

Referring now to Fig. 1, there is shown a ball bearing mounting in which a stationary frame structure 1 is provided with a bearing housing 2. A bearing-receiving recess 3 is formed in the bearing housing 2 and a ball bearing 4 is positioned in the recess. The ball bearing 4 comprises an inner bearing race 5, secured to a shaft 6, with a semi-circular annular groove 7 formed in its outer surface; and an outer bearing race 8 with a semi-circular annular groove 9 formed in its inner surface. A plurality of balls 10 are positioned between the inner bearing race 5 and the outer bearing race 8 and are seated in the annular grooves 7 and 9.

In order to fix the outer bearing race 8 firmly with respect to the housing member 2, and to cushion the bearing to allow realignment, the arrangement now to be described is provided. Referring to Fig. 2, an annular groove 11, having a semi-circular cross-section, is formed in the circumferential wall 12 of the recess 3. An annular ring 13 formed of resilient material, such as rubber or neoprene, is seated in the groove 11. The annular ring 13 has its outer surface 15 curved transversely to fit snugly in the annular groove 11, and its inner surface 16 substantially flat. The inner surface of the annular ring 13 is eccentric with respect to the outer surface 15, as can best be seen by reference to Fig. 3.

When the bearing 4 is inserted, the inner surface 16 of the annular ring 13 engages the outer surface 14 of the outer bearing race 8 and the section of maximum thickness 18 of the annular ring 13 forces the outer bearing race 8 against the diametrically opposite wall 19 of the recess 3. Prior to positioning of the bearing 4 in the annular ring 13, the inside diameter of the ring is slightly smaller than the outside diameter of the outer bearing race 8. After insertion of the bearing, the surplus material in the section of maximum thickness 18 of the annular ring 13 is squeezed into the annular groove 11 causing the inner surface 16 of the ring to lengthen peripherally. This peripheral lengthening causes the material in the section of minimum thickness 17 of the ring to bunch up and completely fill the annular slot 11, as shown in Fig. 1, as contrasted with the unassembled condition of Fig. 2 where the section of minimum thickness 17 of the ring only partially fills the annular groove. The pressure on the outer race 8 at the section of maximum thickness 18 is derived from the lengthening of the material from the center of the section of maximum thickness half way around the annular groove 11 in each direction. This lengthening of the inner surface 16 of the annular ring 13 is actually a deformation in shear in the ring since the outer surface 15 does not move due to the incompressibility of the material. Since the force is generated through such a long section, it is similar to the force generated by a long spring. In this manner, a substantial change in the clearance between the outer race 8 and the inner surface 12 of the housing 2 is accomplished by a minor change in the force at the section of maximum thickness 18 of the annular ring 13.

It can now be readily seen that the eccentricity of the annular ring 13 holds the bearing 3 tightly against one side of the recess 3 of the housing 2. Any play of the bearing caused by eccentric loading of the shaft 6 is taken up by the resilience of the annular ring 13 at its section of maximum thickness 18 and appears as a variation of the clearance 20 between the outer bearing race 8 and the circumferential wall 12 of the recess 3. The utilization of the eccentric ring 13 of this invention holds the bearing tightly in place with respect to the housing even though the clearance is relatively large, such as .0003 inch to .003 inch. This permits the housing to be bored in the initial machining operation and eliminates the necessity for a separate expensive grinding operation which is required for a slip-fit of the bearing in the housing.

It will now be readily apparent that this improved ball bearing mounting utilizing an eccentric annular cushioning ring not only permits quick and economical assembly of the bearing while holding the bearing tightly with respect to the housing to prevent excessive wear and noise due to thumping caused by eccentric shaft loading, but also provides a cushioned bearing capable of realignment with respect to the other bearings on the same shaft.

While there is illustrated and described a particular embodiment of this invention, modifications thereof will occur to those skilled in the art. I desire it to be understood, therefore, that this invention is not to be limited to the particular arrangement disclosed and I intend in the appended claims to cover all modifications which do not depart from the spirit and scope of this invention.

What I claim as new and desire to secure by Letters Patent of the United States is:

1. In combination, a bearing housing having a bearing-receiving recess formed therein and an annular groove formed in the circumferential wall of said recess, a bearing positioned in said recess, and an annular ring of resilient material seated in said groove and engaging the outer surface of said bearing for cushioning said bearing, said resilient ring having its inner surface eccentric with respect to its outer surface whereby the section of said ring having maximum thickness forces said bearing against said wall.

2. In combination, a bearing housing having a bearing-receiving recess formed therein and an annular groove formed in the circumferential wall of said recess, a bearing positioned in said recess and having an inner race and an outer race with anti-friction bearing elements therebetween, and an annular ring of resilient material seated in said groove and engaging the outer surface of said outer bearing race for cushioning said bearing, said resilient ring having its inner surface eccentric with respect to its outer surface whereby the section of said ring having maximum thickness forces said outer bearing race against said wall.

3. In combination, a bearing housing having a bearing-receiving recess formed therein and an annular groove formed in the circumferential wall of said recess, a ball bearing positioned in said recess and having an inner race and an outer race with balls therebetween, and an annular ring of resilient material seated in said groove and engaging the outer surface of said outer bearing race for cushioning said bearing, said resilient ring having its inner surface eccentric with respect to its outer surface whereby the section of said ring having maximum thickness forces said outer bearing race against said wall.

4. In combination, a bearing housing having a bearing-receiving recess formed therein and an annular groove formed in the circumferential wall of said recess, a ball bearing positioned in said recess and having an inner race and an outer race with balls therebetween, and an annular ring of resilient material with its outer surface curved transversely and its inner surface substantially flat, said outer surface of said resilient ring being seated in said groove and said inner surface engaging said outer bearing race for cushioning said bearing, said inner surface of said resilient ring being eccentric with respect to said outer surface whereby the section of said ring having maximum thickness forces said outer bearing race against said wall.

5. In combination, a bearing housing having a bearing-receiving recess formed therein and an annular groove formed in the circumferential wall of said recess, a ball bearing positioned in said recess and having an inner race and an outer race with balls therebetween, and an annular ring of resilient material seated in said groove with its inner surface engaging said outer bearing race for cushioning said bearing, said inner surface of said resilient ring being eccentric with respect to the outer surface of said ring, the section of said ring having minimum thickness being wholly disposed within said groove and the section having maximum thickness forcing said outer bearing race against said wall.

LAWRANCE W. WIGHTMAN.

No references cited.